3,542,755
GELATIN EXTRACTION UTILIZING LOW PRESSURE STEAM IN AN ATMOSPHERE OF REDUCED PRESSURE

Peter John Tiemstra, La Grange, Ill., assignor to Swift & Company, Chicago, Ill., a corporation of Delaware
No Drawing. Continuation of application Ser. No. 664,654, Aug. 31, 1967. This application Nov. 20, 1969, Ser. No. 871,703
Int. Cl. C09h 3/00
U.S. Cl. 260—118     8 Claims

ABSTRACT OF THE DISCLOSURE

A method of treating collagenous material utilizing low-pressure steam in an atmosphere of reduced pressure with reduced quantities of heat, moisture and time required for processing.

---

This application is a continuation of application Ser. No. 664,654, now abandoned.

The present invention relates in general to the processing of collagenous material and more specifically to the treatment of such material with low-pressure steam in a partial vacuum.

Specific examples of collagenous material that can be extracted by this process but which are not intended to be inclusive are: animal and poultry hides and skins; feet; tendons and connective tissues; ears; snouts, and tail trimmings. Usually this material has been "cured" or treated with an acid or an alkali such as hydrochloric acid, sulfuric acid, phosphoric acid, acetic acid, fumaric acid, fruit acids such as: citric, malic, tartaric, adipic, oxalic, etc.; or an alkali such as lime, soda, ash, potash, and ammonium. The curing of collagenous material in either an acid or an alkaline aqueous solution is for the purpose of preparing the collagen therein for being readily hydrolyzed during the extraction procedure. During the curing step the collagenous material or "stock" increases in size and weight due to the absorption of water and acid or alkali. This absorption is normally called "plumping" and amounts to from 25 to 150 percent additional weight in the material over its original raw weight. Excessive penetration of the acid or alkali into the skin produces too much hydrolysis of the collagen which results in low gel strength products. To counteract excessive amounts of acid or alkali, which are usually employed to obtain the economy of rapid curing, washing or neutralization is often practiced. Since curing takes place at room temperature or lower, little hydrolysis occurs and thus a minimum of gelatin is lost in draining the cure or subsequent wash waters.

To obtain the gelatin, heat is applied to hydrolyze and solubilize the collagen. Usually this is accomplished with hot water. Since the stock is cold, the temperature of the water added to the cured material must be in excess of the desired extraction temperature. High bloom gel strength and viscosity materials are obtained only when there is a minimum of hydrolysis. Therefore, to obtain very high quality gelatin temperatures between 120 and 160° F. are usually used. To obtain such temperatures, it is necessary to add water over 180° F., or heat the contents of the tank. Both these methods may result in localized overheating of the outer parts of the stock which produces excessive hydrolysis whereas the inner parts of the stock will be only slightly affected and will not yield as well.

The most universal method presently practiced of extracting gelatin from collagen-bearing materials is the batch process wherein the collagenous material, preferably cured, is placed in a large tank and treated for long periods in heated water. Several applications of water, usually 5–7 called "cooks" are made at successively increasing temperatures, the first being at about 120–130° F. and the last being at about 200° F. or higher. Extracts are drawn off after each cook, with the gel strength, viscosity, and general appearance and quality of the extracted gelatin deteriorating as each successive extract is drawn off. This deterioration is due to the rapid breakdown of the gelatin molecule into smaller units when exposed to high temperatures in solution for extended periods. The total time required to extract the gelatin from a batch of collagen-bearing stock, computed from the time of filling the first cooking tank or kettle to the next batch, is in the neighborhood of at least 30–40 hours. After extraction, the water containing extraction gelatin is called "gelatin-liquor" and is filtered, concentrated, gelled, cut, dried to the neighborhood of 10 percent moisture, and usually ground to a powder.

Another popular method of extracting gelatin is by subjecting the collagen-bearing material to a countercurrent multiple stage extraction in a plurality of extracting zones while maintaining a temperature gradient on the extraction liquid passing through the extraction zones. The advantage of the countercurrent polyzonal extraction over the cook method is that by regulating the temperatures in the different extraction zones and the continuous washing action of the countercurrent extraction liquors permits more rapid extraction of the gelatin.

Both the cook and countercurrent methods of extraction require excessive quantities of water and extended treatment at relatively high temperatures which tends to produce a single grade of gelatin and requires the evaporation of large quantities of water to obtain the final product. In order to heat and subsequently evaporate these excessive quantities of water, large amounts of heat are also required.

Therefore, it is a primary object of my invention to provide an improved method of treating collagenous material by subjecting such material to low-pressure steam under a partial vacuum.

An additional object of my invention is to provide an improved process for shrinking "plumped" stock by subjecting it to low-pressure steam under partial vacuum.

Another object of my invention is to provide a process for the extraction of gelatin whereby the amount of heat usually required to effect the extraction is substantially reduced.

Another object of my invention is to provide a process for extracting gelatin whereby the ratio of solids to the extraction liquors is substantially increased.

Another object of my invention is to provide a process for extracting gelatin whereby the amount of time required to effect the extraction is substantially reduced.

Another object of my invention is to provide a process for extracting gelatin whereby the volume of the extraction liquor is substantially reduced.

Yet another object of my invention is the avoidance of localized overheating and uneven hydrolysis of collagenous material during the extraction procedure.

An additional object of my invention is to provide an improved method for gelatin extraction from cured collagen-bearing stock enclosed in a partial vacuum into which steam is injected so that it percolates through and between layers of stock in an aqueous slurry and extracted gelatin drained off in the desired quality fraction.

Other objects of this invention will appear hereafter as the description thereof proceeds, the novel features, modifications, arrangements, and combinations being clearly set forth in the accompanying specification and claims.

Generally the present invention relates to improved procedures for the efficient extraction of high quality test gelatin from collagen-bearing material by contacting such material with low-pressure steam in an atmosphere under reduced pressure.

More specifically the present invention relates to an improved method for treating collagenous material by enclosing such material in a pressure chamber, drawing a partial vacuum, such as a 24-inch vacuum, and injecting low-temperature steam into the chamber at somewhat increased pressure without the addition of extraneous water. The particular vacuum employed will vary according to the influence of several factors such as the degree to which the temperature of the stock is to be raised, the time available for extraction, the quality of the product being treated, etc. Usually, however, a vacuum of between 20 and 28 inches will be employed. Generally, the steam pressure ranges from about 1.7 to about 3.7 p.s.i. with a range of 2.0 to 2.5 p.s.i. being preferred. As the steam hits the cold stock and condenses, a substantially equal vacuum is created thereby drawing additional steam into the chamber. The steam can enter either the top or the bottom of the chamber, although injection through the bottom is preferred since heat tends to travel upward thereby evenly heating the condensate, the extracted gelatin liquors and the gelatin-stock or collagen-bearing material. The temperature of the steam is determined by the pressure in the tank and hence the pressure control on the extraction vessel will regulate the temperature of the stock and extracting liquor. Although the temperature of the steam entering the pressure chamber is not considered critical to this invention, it generally ranges from about 122° to about 150° F. A temperature pattern can be set so that steam of increasingly higher temperature can be injected into the pressure vessel over a definite time sequence. Thus the rate of hydrolysis can be accurately regulated. The temperature of the stock is usually elevated to about 130° F. and will generally range between 125° and 150° F. during the shrinking of the stock.

Properly cured stock has a high moisture content due to the plumping process described previously. Hence the collagen is diluted to a lower concentration in the cured stock than it was originally in the raw material. As the collagen is hydrolyzed and solubilized, it is separated from the cellular structure of the collagen-containing material. The extraction of quality gelatin is directly related to the length of time the gelatin-liquors are exposed to elevated temperatures, since the gelatin molecule progressively deteriorates the longer it is exposed to elevated temperatures. The partial vacuum of the present invention permits the use of processing temperatures below those employed in conventional extraction procedures. The treatment of gelatin stock with steam under a partial vacuum causes the hydrolyzed collagen and excess moisture in the stock to solubilize or shrink out more rapidly and completely than in conventional water extraction procedures. This superior shrink of the stock substantially enhances the extraction of collagen from the cellular structure of the tissue. The extraction liquor resulting from this initial shrinking process contains a very high percentage of solids and produces gelatin of a very high quality. The reduced volume of the collagenous material also permits a significant reduction in the volume of the extraction liquors. This reduction in the gelatin-liquors obviously results in a substantial savings in the amount of heat required both during the extraction procedure and the subsequent concentrating and drying steps. Consequently, it is seen that initial heating or shrinking out of the collagenous material with steam under reduced pressure results in extracts with higher solids content, a product of superior quality, and an extraction process requiring less time and heat to effect the extraction and subsequent drying steps.

After the gelatin-stock has been reduced to at least half and preferably to about ¼ the original volume and the temperature raised to the desired level it is obvious that the extraction process may be completed without the addition of any extraneous water, particularly if extracts possessing abnormally high solids and high quality gelatin are desired. However, the final extraction steps may be accelerated by periodically washing the stock with minor amounts of water. Generally the added water is heated to the temperature of the warm stock. Although the added water tends to dilute the concentration of solids in the gelatin-liquors, the percentage of solids remains substantially higher than those present in conventional cook or countercurrent extraction procedures. The total gelatin-liquors, including the wash waters, need not cover more than half of the stock. Therefore, since the stock has been shrunk prior to the washings and since there is a continuous accumulation of extraction liquors and condensate from the steam, only minor amounts of wash water need be added. The addition of this water tends to accelerate the removal of the viscous gelatin extracts from the collagenous material and the steam being injected into the lower portions of the stock causes the gelatin-liquors to circulate through the stock thereby producing an effective scrubbing action. The addition of wash water merely accelerates the extraction process by aiding in the solubilizing of collagen extracts from the collagenous material.

It has also been found advantageous to employ low-pressure steam in a partial vacuum during the initial extraction phase and following this with a conventional type cook by covering the stock with water, and heating.

The following examples are intended as illustrative only and should not be construed as limiting the scope of the disclosure.

EXAMPLE I

To show the advantage of continuous collection of the gelatin-liquors without the addition of extraction liquors, 1000 pounds of acid cured pork skins were placed in a pressure tank and a 25-inch vacuum was drawn. High-pressure steam which had been reduced to 5 p.s.i. was injected through a 4-inch pipe into the bottom of the extraction vessel. Saturated steam was thus passed into the extraction vessel at temperatures dictated by the vacuum of the tank. The temperature of the steam entering the tank was 130° F. After 60 minutes the temperature of the stock was 130° F., and the stock had shrunk to about 24 percent its original volume, the gelatin-liquors were continuously drawn off and immediately concentrated, dried and analyzed. The results were that after 2 hours of heating at about 130° F., about 33 percent of the protein had been recovered in extraction liquors containing about 6 percent solids and the gelatin bloom gel strength averaged about 330. The heating was continued an additional 6 hours at temperatures ranging from 150° F. to about 180° F. during which time an additional 42 percent of the protein was recovered at an average bloom gel strength of about 260.

EXAMPLE II

To demonstrate the advantage of washing the stock with minor amounts of extraneous water after the initial heating and shrinking, 1000 pounds of acid cured pork skins were placed in a pressure tank and a 25-inch vacuum was drawn. High-pressure steam which had been reduced to 5 p.s.i. was injected as in Example I into the bottom of the tank. Saturated steam was thus passed into the extraction vessel at temperatures dictated by the vacuum in the tank. The temperature of the steam entering the pressure tank was 128° F. After 60 minutes the temperature of the stock was 126° F. and the stock had shrunk to less than one-fourth the original volume. The extraction temperature pattern shown in the table given below was obtained by varying the vacuum on the tank. After the initial two extractions were made without added water, warm water (130° F.) was added rapidly by spraying 8 gallons over the top of the stock at 90, 150, 220, 330 and 440 minutes after the extraction had commenced. The wash water added brought the gelatin-liquors to about half the level of the preshunk stock and caused a vigorous "dancing" of the stock as the low-pressure steam passed through.

| Extraction No.: | Extraction time | Stock temp. | Percent solids | Percent protein recovery | Bloom gel strength |
|---|---|---|---|---|---|
| I | 0-35 | 125 | 4.20 | 11.9 | 330 |
| II | 35-60 | 126 | 5.80 | 12.2 | 329 |
| III | 60-110 | 130 | 6.56 | 15.8 | 326 |
| IV | 110-190 | 145 | 6.10 | 15.2 | 315 |
| V | 190-240 | 160 | 5.63 | 13.1 | 310 |
| VI | 240-360 | 170 | 5.21 | 10.9 | 286 |
| VII | 360-480 | 180 | 4.89 | 8.1 | 280 |
| Total | | | | 87.2 | |

EXAMPLE III

To illustrate the advantage that is obtained from preshrunk stock using the combination of washings and normal cooking procedures similar samples of stock as employed in Examples I and II were prepared, with extractions I and II having no water added; extractions III, IV and V were washed as shown in Example II; and, extractions VI and VII were covered with water and heated in an open tank at 165–175° F., and at a gentle boil (212° F.), respectively, for two hours.

| Extraction No.: | Extraction time | Stock temp. | Percent solids | Percent protein recovery | Bloom gel strength |
|---|---|---|---|---|---|
| I | 0-35 | 125 | 4.10 | 9.5 | 329 |
| II | 35-60 | 128 | 5.90 | 13.9 | 312 |
| III | 60-110 | 130 | 6.48 | 16.0 | 328 |
| IV | 110-190 | 145 | 6.12 | 12.8 | 326 |
| V | 190-240 | 160 | 4.98 | 8.9 | 310 |
| VI | 240-360 | 170 | 6.12 | 14.7 | 236 |
| VII | 360-480 | 212 | 5.10 | 10.5 | 57 |
| Total | | | | 86.3 | |

EXAMPLE IV

To illustrate the advantage of employing preshrunk stock with conventional cover cook procedures, 1000 pounds of stock was prepared in a manner similar to the other examples by heating the stock with steam of 138° F. in a vacuum of 24 inches for 1 hour after which the stock had shrunk to about 35 percent the original volume. Extracts I, II and III were removed at 20-minute intervals without added water. The stock was then subjected to four successive water cover cooks.

| Extraction No. | Extraction time | Stock temp. | Percent solids | Percent protein recovery | Bloom gel strength |
|---|---|---|---|---|---|
| I | 20 min | 135 | 4.41 | 9.6 | 330 |
| II | 20 min | 136 | 5.63 | 13.6 | 326 |
| III | 20 min | 138 | 7.60 | 7.7 | 360 |
| IV | 1½ hours | 138 | 4.82 | 18.9 | 296 |
| V | 2 hours | 150 | 4.55 | 17.1 | 256 |
| VI | do | 180 | 4.36 | 16.1 | 126 |
| VII | do | 212 | 5.54 | 5.6 | 46 |
| Total | | | | 88.6 | |

EXAMPLE V

To illustrate the advantage of using preshrunk stock over conventional extraction procedures, 1000 pounds of acid cured pork skins were placed in an open tank equipped with a steam jacket and the stock covered with water of 212° F. and heated for 60 minutes until the stock temperature was 124° F. The stock was then subjected to six successive cover cooks with the results as follows:

| Extraction No.: | Extraction time | Stock temp. | Percent solids | Percent protein recovery | Bloom gel strength |
|---|---|---|---|---|---|
| I | 60 | 135 | 3.6 | 34.7 | 314 |
| II | 60 | 138 | 1.9 | 10.9 | 308 |
| III | 60 | 140 | 1.3 | 6.0 | 284 |
| IV | 120 | 155 | 1.9 | 11.8 | 280 |
| V | 120 | 180 | 2.0 | 11.6 | 255 |
| VI | 120 | 212 | 3.1 | 9.9 | 99 |
| Total | | | | 84.9 | |

To illustrate by comparisons the savings in the heat requirements between low-pressure steam extraction and regular cover cook extraction, three identical runs were made, two employing low-pressure steam under a partial vacuum and the third using convention cook procedures. The total heat requirements per pound of gelatin produced were:

Test: Calories per gram of dry gelatin
LPS-A _____ 10,760
LPS-B _____ 10,305
Regular _____ 22,330

Although the skins processed in the low-pressure steam for less than half the time required for the regular extraction, the average per cent solids in the gelatin liquors were as follows:

Test: Percent solids recovered
LPS-A _____ 5.5
LPS-B _____ 5.6
Regular _____ 2.7

The low-pressure steam skins had shrunk to about one-fourth the original volume before extraction thus requiring less extraction fluids, less B.t.u.'s to heat the fluids and less time and heat to process the extraction liquors during the concentration and drying steps. This saving in time is very significant since under conventional procedures the time required for concentrating and drying represents a "bottleneck" in the factory operations.

Obviously many modifications and variations of the invention as hereinbefore set forth may be made without departing from the spirit and scope thereof and therefore only such limitations should be imposed as are indicated in the appended claims.

I claim:
1. An improved process for extracting a superior quality gelatin having a very high ratio of solids to the extraction liquors, from cured hides and skins without the addition of extraneous water comprising:
  drawing a partial vacuum of from about 20 to about 28 inches on cured hides and skins;
  contacting the hides and skins with low pressure steam in the partial vacuum at a temperature of from about 122 to about 180° F. for a time sufficient to shrink the volume of the hides and skins by at least 50%; and
  recovering each gelatin-fraction as desired without the addition of extraneous water.
2. In the process of claim 1 wherein the hides and skins are contacted with low pressure steam ranging between about 130 to about 150° F. for a time sufficient to shrink the volume of hides and skins by at least 75%.
3. In the process of claim 1 wherein the low pressure steam is injected upward through the lower portion of the cured hides and skins whereby the condensate liquors are percolated through and between the hides and skins.
4. An improved process for extracting gelatin from cured hides and skins comprising:
  drawing a partial vacuum of from about 20 to about 28 inches on cured hides and skins;
  contacting the cured hides and skins in the partial vacuum with low pressure steam ranging from about

122 to about 180° F. for a time sufficient to shrink the original volume by at least 50%;
removing each gelatin-fraction as the desired level of solids is obtained without the addition of extraneous water;
thereafter subjecting the preshrunk hides and skins to a plurality of washings in the partial vacuum with minor amounts of water up to half the volume of said preshrunk hides and skins to accelerate the solubilization of the gelatin extracts from the hides and skins; and
heating with low pressure steam until the desired solids level is obtained.

5. The process of claim 4 wherein the low pressure steam is injected upward through the lower portion of the preshrunk hides and skins whereby the condensate liquors are vigorously circulated therethrough to produce an effective scrubbing action to further accelerate the solubilization of the gelatin extracts.

6. In the process of claim 4 wherein each successive washing is heated to a higher temperature.

7. In the process of claim 4 wherein the partial vacuum is removed after the washing steps and the preshrunk hides and skins are covered with water and cooked for a time sufficient to solubilize a substantial portion of the gelatin remaining therein.

8. In the process of claim 7 wherein the hides and skins are subjected to a plurality of cookings each having a successively higher temperature.

References Cited

UNITED STATES PATENTS

| | | | |
|---|---|---|---|
| 60,968 | 1/1867 | Upton | 260—118 |
| 243,713 | 7/1881 | LePage | 260—118 |
| 307,754 | 11/1884 | Ekman | 260—118 |
| 1,009,616 | 11/1911 | Zimmerman | 260—117 |
| 1,063,229 | 6/1913 | Upton | 260—118 |
| 1,761,362 | 6/1930 | Pansky | 260—118 |
| 1,904,003 | 4/1933 | Kohl | 260—118 |
| 2,020,234 | 11/1935 | Bowman et al. | 260—118 |
| 2,590,303 | 3/1952 | Fladmark | 99—2 |
| 2,628,916 | 2/1953 | Scherer | 106—135 |
| 2,881,158 | 4/1959 | Harkness et al. | 260—118 |

FOREIGN PATENTS

| | | |
|---|---|---|
| 10,616 | 1909 | Great Britain. |
| 28,297 | 1909 | Great Britain. |

OTHER REFERENCES

Dictionary of Applied Chemistry, Thorpe, vol. V, 1941, pp. 504–505.

WILLIAM SHORT, Primary Examiner

H. SCHAIN, Assistant Examiner